Oct. 27, 1959　　　　A. S. KROTZ　　　　2,910,131
FOUR WHEEL DRIVEN AND STEERED VEHICLE
Filed Oct. 3, 1955　　　　　　　　　　6 Sheets-Sheet 1

INVENTOR.
ALVIN S. KROTZ

Oct. 27, 1959  A. S. KROTZ  2,910,131
FOUR WHEEL DRIVEN AND STEERED VEHICLE
Filed Oct. 3, 1955  6 Sheets-Sheet 4

FIG. 8

INVENTOR.
ALVIN S. KROTZ

Fig.12

United States Patent Office 2,910,131
Patented Oct. 27, 1959

2,910,131

FOUR WHEEL DRIVEN AND STEERED VEHICLE

Alvin S. Krotz, Akron, Ohio

Application October 3, 1955, Serial No. 538,073

8 Claims. (Cl. 180—45)

This invention relates to motor vehicles, and more particularly to passenger cars. The invention achieves several significant improvements in such vehicles particularly in that it provides for better acceleration under power, better deceleration under braking, less tendency to skid, better handling and the ability to maintain appreciably better average speed over a given circuit involving turns, accelerations and decelerations, and to do so with greater comfort and safety and less fatigue to the driver and passengers. It further provides for a neater or cleaner chassis construction of lighter weight than is customary with presently accepted design.

According to this invention the front and rear wheels of a four wheeled vehicle are geared together, without an interposed interaxle differential, so that rotation of the front differential case and rear differential case is exactly the same. A differential is provided in the front drive and in the rear drive with an optional locking feature which will cause the right and left wheels to rotate together, either postively or through one of the high friction type differentials well known in the art.

A further feature is that in place of the universally accepted Ackerman steering layout, this vehicle steers all four wheels about a point located on a transverse line placed midway between the front and rear wheels, so that the steering angle of, for example, a left front and left rear wheel will normally have the same magnitude but opposite directions. A modification of this angle is described later as a means of providing understeering on corners.

It is recognized that, for any vehicle regardless of drive, weight is transferred to the rear during acceleration or engine power application and to the front during braking. The torque transmitted to one pair of wheels only, as now conventional, affects the adhesion of the tires to the road in such a way that well trained drivers are inhibited from using engine power as they might wish because of the necessity of maintaining adhesion of the tires. With this invention, where drive is transmitted by all four wheels, the tendency to slip or skid on power application is reduced.

The effect of the novel construction on the braking is more marked in some respects than the effect on acceleration. During braking the load transfer to the front wheels as described in more detail later is well known. In current car design the designer must take his choice between even division of braking force front and rear or possibly 45% in front as was once customary, in which two cases his rear wheels will slip during heavy braking since the rear wheels are unloaded by load transfer, or on the other hand, if the designer puts more braking power on the front wheels there is danger of the front wheels slipping and losing directional control on slippery surfaces where total braking force is not sufficient to cause large weight transfer to the front. In the proposed design, since the front differential carrier and the rear differential carrier are connected by a driving means, without an interposed or interaxle differential, braking is automatically distributed and during maximum braking there is no chance of the rear only slipping, and also, on slippery going there is no chance of the front only slipping.

A further principle of this invention is that since the front and rear differential carriers rotate alike, the braking system or, at least, the main service brake may be a single braking means, located either on the drive shaft common to the front and rear axle as described later, or may be driven by a ring gear on one of the differential carriers, which ring gear may be the same or may optionally be different from the ring gear which drives the differential carrier in applying power, or the brake system may be one or more brake means located as above or one or more brake means may be located on the differential housing, at each side and driven by the differential side gears.

The use of a single brake means, made possible by the geared relation of front and rear differential carriers to each other, makes possible the use of advanced designs of dynamic brakes, such as magnetic flux brakes, hydraulic brakes, or water cooled friction brakes, all of which devices are known to the industry but which have thus far been too complicated, heavy and costly to be applied to the four wheels.

The combined effect of similar rotation of front and rear wheels, as for example front and rear wheels traveling the same path, as described in more detail later, and reduced unsprung weight of the road wheels by using a single brake remote from the wheels, gives the vehicle a large advantage in road holding, cornering, directional stability, acceleration or high torque application and deceleration or braking.

Described also hereafter is a means by which a mass may actuate an understeering control for cornering which is of great importance to this invention.

Another feature of this invention is that the forward and rearward differential carrier housings, together with engine, transmission and longitudinal drive shafting and main braking system shall be fastened in or on one housing, fastened together in such a way as to make this assembly an integral unit without motion between the forward differential housing, rearward differential housing, engine, transmission and braking system.

A further optional feature of this invention is an engine embodying some features known to the art but in a combination which is novel. The engine has a large diameter central tubular shaft which replaces the crank shaft used on more conventional engines and may be so disposed that the drive shaft, driving both front and rear differential carrier, passes through this central engine tube. The engine may be disposed just rear of the front differential housing, connected by a hollow drive tube with a transmission located forward of the rear differential housing. The reversal of these two positions, that is, with the engine forward of the rear differential and the transmission rearward of the forward differential is optional.

While a novel gear type transmission is described herein, a torque converter may optionally be used without losing the novelty of the invention.

The invention will be further described with reference to the accompanying drawings in which is shown one form of vehicle constructed in accordance with and embodying this invention. In the drawings.

Figure 1:
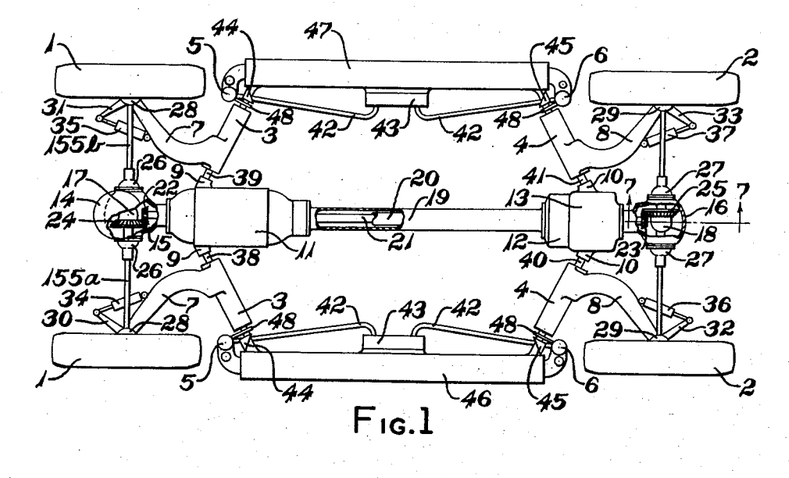
Fig. 1 is a plan view of the chassis of a vehicle of representative design, the front of the vehicle being the left portion of the view.
Figure 2:
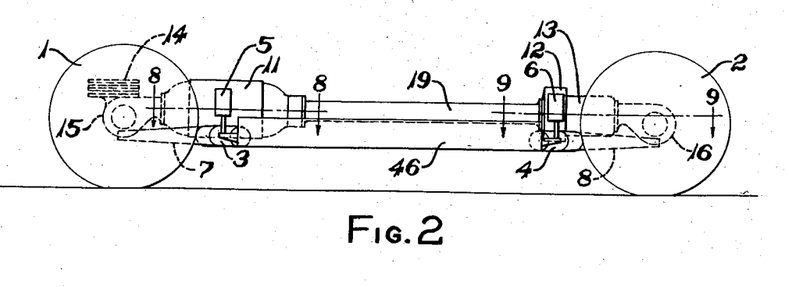
Fig. 2 is a side view of the vehicle shown in Fig. 1.

In Figs. 1 and 2 front wheels 1 and 1 and rear wheels 2 and 2 are supported elastically from the chassis by wheel support arms 7 and 7 and 8 and 8. Engine 11 drives clutch 12 by drive tube 20 while transmission 13 drives differential case 17 in front and 18 at the rear at the same speed by means of drive shaft 21 driving pinion 22 in front and 23 at the rear. Tubular housing 19 connects engine 11 and clutch and transmission 12 and 13 to differential housing 15 in front and 16 in the rear, making a rigid assembly. Brake means 14 is driven by ring gear 24 of the front differential case 17 and is attached to the front differential housing 15. The rear differential case 18 includes a ring gear 25 driven by pinion 23.

The forward differential case 17 drives the front wheels 1 and 1 through double universal joints 26, 26 and 28, 28, and the rear wheels 2 and 2 are driven similarly by differential case 18 through universal joints 27, 27 and 29, 29. All four wheels are steerable about king pin axes passing through or approximately through the centers of the respective outboard universal joints 28 and 29. Steering angle is controlled through steering arms 30, 31, 32 and 33 by four separate double acting hydraulic pistons operating in wheel steering cylinders 34, 35, 36 and 37. Means of controlling the flow of hydraulic fluid to these cylinders is described later.

The wheel support arms 7, 7 and 8, 8 are mounted on torsion springs 3, 3 and 4, 4, the outer shells of which rotate elastically.

The adjustable stationary inner members of springs 3, 3 and 4, 4 are central shafts 38, 39, 40 and 41, in the embodiment shown. The rotational position of these shafts is controlled by torque reacting levers 48 which in turn are positioned by hydraulic pressure in wheel control cylinders 5, 5, and 6, 6 which hydraulic pressure is controlled in turn by hydraulic means to maintain uniform mean height of the sprung part of the vehicle above the respective wheels or to control front to rear slope of the chassis relative to the wheels, both methods being known and practiced in the art. See, for example, the arrangement of this type spring suspension described in my U.S. Patent 2,845,280 for further mechanical details.

Pipe lines 42 connect front and rear wheel control cylinders 5 and 6, at one side of the vehicle, through articulation control device 43 shown and described in detail in my aforesaid U.S. Patent 2,845,280.

Shaft members 38, 39, 40 and 41 are supported by bearings mounted on the engine, differential, transmission assembly, described above, at mounting points 9 and 9, and 10, 10. In this embodiment the outboard ends of shafts 38, 39, 40 and 41 are supported by bearings mounted at 44, 44 and 45, 45 to other portions of the chassis such as frame side tubes 46 and 47.

Figures 3, 4:
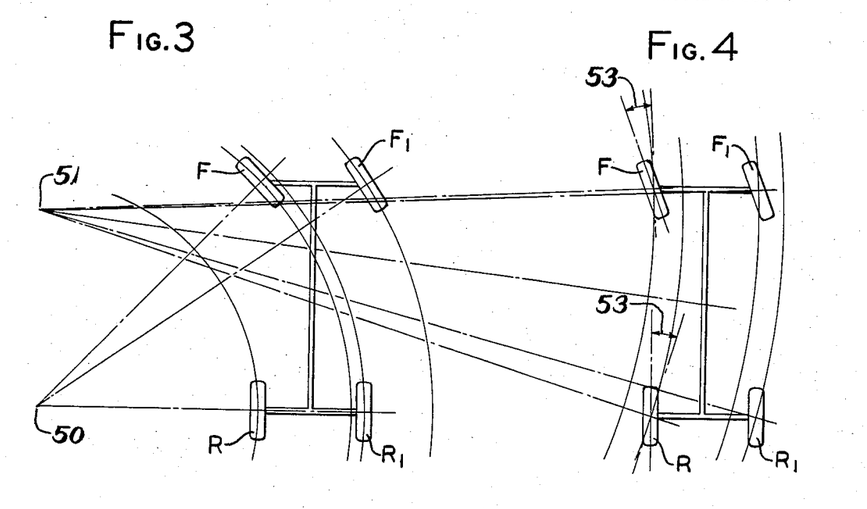
Fig. 3 is a diagram of a conventional vehicle having Ackerman steering.
Fig. 4 is a diagram showing Ackerman steering geometry when rounding a turn at higher speed.

In Fig. 3 a conventional car is represented while turning slowly about center 50 as in accepted Ackerman steering. Front wheels F and $F_1$ are turned into the direction of turning. As the vehicle speed is increased centrifugal force urges the entire vehicle away from point 50. It is well known that a rolling tire develops resistance to transverse force only when there is a slip angle, as at 53, Fig. 4, which is the angle between the line of actual travel and the direction the wheel is pointed. With Ackerman steering the front tires develop a slip angle by travelling in a circle greater than that indicated in Fig. 3. However, the only means of developing a slip angle at the rear tires R and $R_1$ is for the vehicle to change its attitude toward the meta center 51 about which the vehicle is moving, as shown in Fig. 4. Some analysts consider this simply as a moving forward of point 50 until it lies at 51 for the vehicle travelling as in Fig. 4. Such an analysis is correct excepting that the driver is usually attempting to circle about a more or less fixed center instead of a theoretical point such as 50 or 51 and the result is that the vehicle takes on a counter-clockwise rotation while sliding outwardly away from point 50. The higher the speed and the sharper the turning radius, the larger the centrifugal force becomes and the greater the slip angle must be on all the tires. Since the rear tires must obviously travel at a greater radius from point 51 than the front tires, the centrifugal force on the rear tires increases more rapidly than centrifugal force on the front tires and this, combined with the counter-clockwise rotation of the car necessary to produce added rear slip angle, sets up a condition favoring skidding and loss of control. If the driver then applies driving power at the rear wheels there is an added factor of instability as the adhesion of the tires in resisting skid is lessened. Also, if the driver attempts to apply the brakes, particularly when driving hard, there is an appreciable transfer of vertical tire load to the front tires together with a front tire decelerating force acting at a shorter radius from point 51 than the radius from 51 to the rearward portion of the vehicle with the result that skidding is encouraged and less control exercised by the driver over the vehicle.

Figures 5, 6:
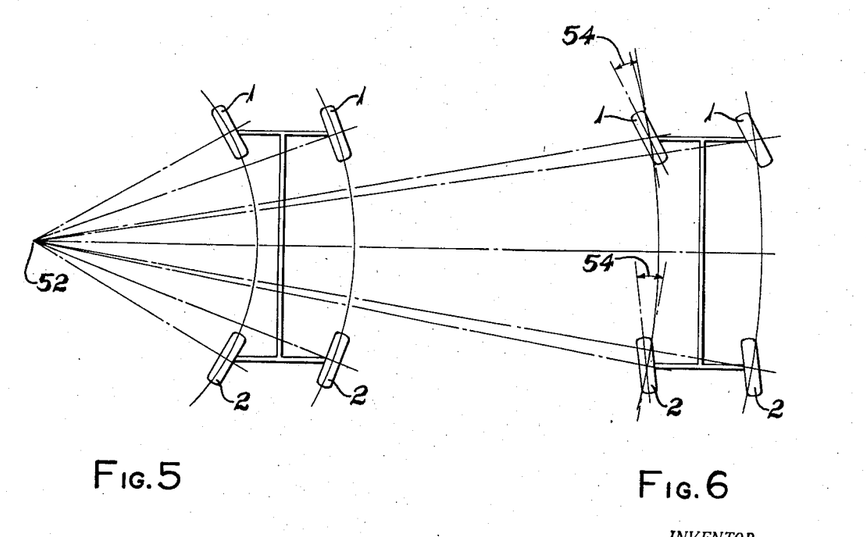
Fig. 5 is a diagram of the low speed steering action provided by this invention.
Fig. 6 is a diagram of the higher speed steering action provided by this invention.

Figs. 5 and 6 are diagrams of the improved construction when rounding a curve. In the initial state, at low speeds as in Fig. 5, the vehicle turns about point 52 located on a transverse line bisecting the wheelbase. The steering angle of front wheels 1 and rear wheels 2 is equal in magnitude but opposite in direction relative to the longitudinal center line C of the vehicle. There is some advantage in road holding where the front and rear tire on the same side of the vehicle travel the same path as shown and are forced to travel at the same average speed for all four wheels, but as speed is increased the vehicle would change its attitude in order to develop slip angle on the rear tires, as the conventional car did in Fig. 4, except for one feature of this invention which is a means of steering the rear wheels into the turn by an amount proportionate to the centrifugal force which is urging the car out of the turn. This means of steering the rear wheels at higher speeds is described later.

Fig. 6 shows the novel construction with slip angle 54 at both front and rear wheels so that the cornering power of front and rear wheels is similar, and there is no change in attitude of the vehicle and the rear tires travel the same radius about point 52 as the corresponding front tires, with the overall effect, particularly when combined with equal rotation of the front and rear differential case, of giving the novel construction increased cornering power and added directional control and safety. Also a further modification of Ackerman principles is preferred practice. Ackerman steering calls for a difference between right and left steering angle amounting to from six to ten degrees. However as soon as the speed of the car increases the radius from the wheels to the meta-center as 51 Fig. 4 increases so that this difference between right and left wheel should be less than Ackerman geometry. This effect is well known but is of added importance with this invention where slippage between the tires and the road is minimized, particularly at higher speeds.

Figures 7, 9, 10:
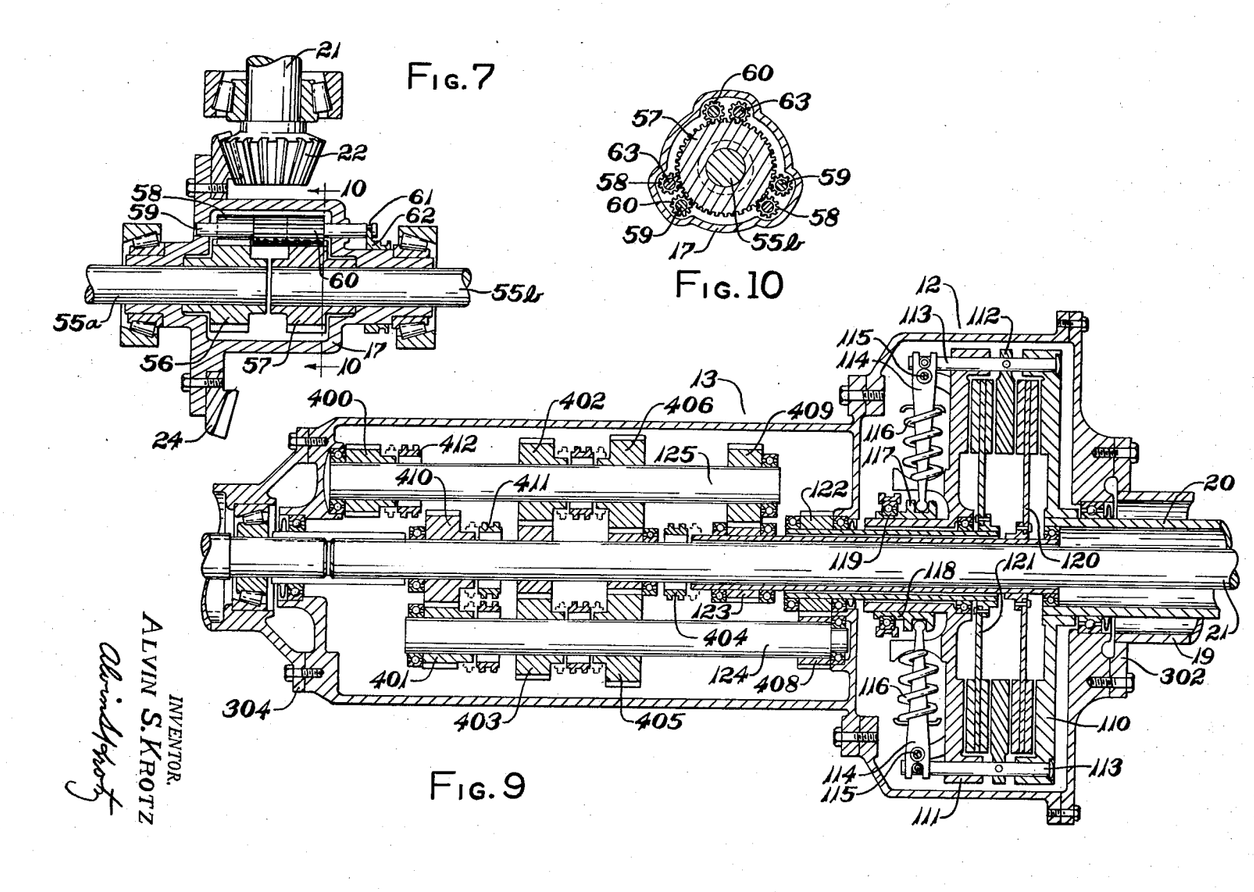
Fig. 7 is a partial section of Fig. 1 along line 7—7 to show one embodiment of a locking differential.
Fig. 9 is a partial section of Fig. 2 along line 9—9 showing one embodiment of a transmission.
Fig. 10 is a partial section of Fig. 7 along line 10—10 showing the differential construction.
Figure 12:
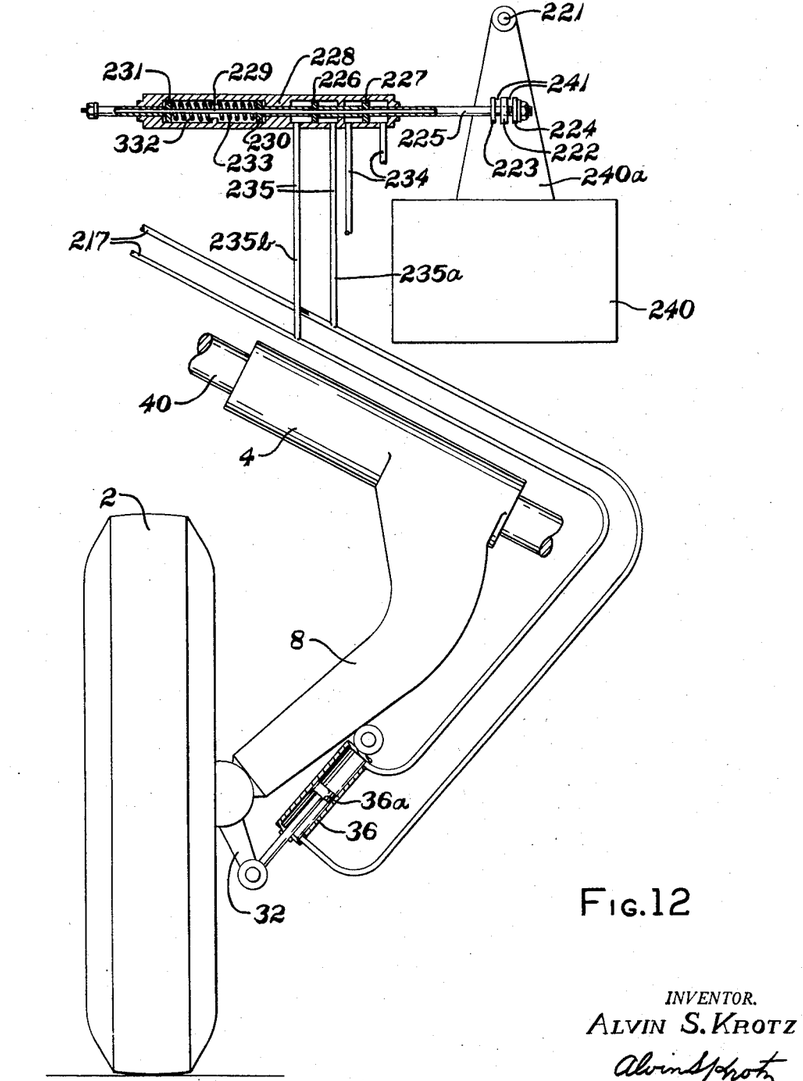
Fig. 12 is a schematic view of the left rear wheel of Fig. 1 together with a mechanism for understeering on fast cornering.

Figs. 7 and 10 show drive shaft 21 driving pinion 22 which in turn drives the front differential carrier 17 by means of a ring gear 24. Differential carrier 17 drives a series of differential gears 60 carried on gear shafts 59, and carrier 17 also drives a series of differential gears 58 carried on gear shafts 63 (Fig. 12). Each gear 58 in turn is meshed with a differential gear 60 and side gear 56 but is not meshed with side gear 57. Each gear 60 in turn meshes with side gear 57 but under the conditions shown in Fig. 7 is not meshed with side gear 56. The gear shafts 59 extend beyond carrier 17 and each has a groove 61 at one end engaging a fork in differential lock control ring 62. When ring 62 is displaced to the left from its position in Fig. 7 each gear 60 is caused to mesh with side gear 56 as well as remaining in mesh with side gear 57 so that side gears 56 and 57 are locked so that they rotate together. Side gears 56 and 57 are fastened to differential shafts 55a and 55b, respectively. Shafts 55a and 55b in turn drive universal joints 26 and axles 155a and 155b (see Fig. 1) to drive the front wheels 1. In normal position as shown, side gears 56 and 57 can rotate at different speeds in a relationship where half of the algebraic sum of the rotation of the side gears 56 and 57 is equal to the rotation of case 17, which is well known to be the normal function of common differential gears as used on vehicles.

The rear differential mechanism 18 in Fig. 1 is identical with the mechanism of Fig. 7, the corresponding parts bearing different reference numerals as will be evident in Fig. 1.

Figure 8:
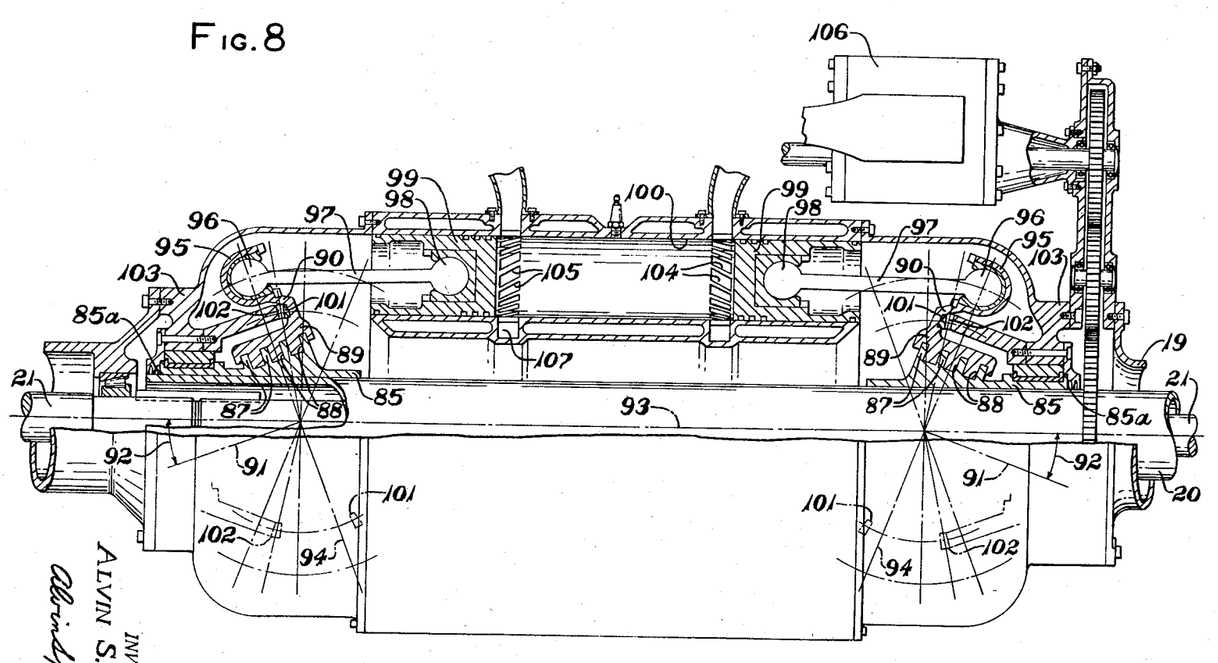
Fig. 8 is a partial section of Fig. 2 along line 8—8 showing engine construction.

In Figure 8, there is shown a sectional view of a special type engine used in combination to obtain special results in this invention. Numeral 21 is the drive shaft geared to front and rear differential carrier, 20 is the drive tube transmitting engine torque to the clutches and 19 is the tubular housing connecting engine, clutch, transmission and front and rear differential housings in one rigid assembly. Drive tube 20 carries wobble plate bearing shafts 85, mounted rigidly as by brazing at 85A to tube 20. Thrust collars 87 integral with 85, and cylindrical surfaces 88 are provided to take thrust and radial load from wobble plate split bearing 89 which is shown for simplicity as a part of wobble plate 90. Centerline 91 about which collars 87 and cylindrical surfaces 88 are surfaces of rotation, is tilted at angle 92, which is here shown at 20 degrees from centerline 93 which is the center of tube 20. Wobble plate 90 has one or more ball sockets 95 arranged in a circle about axis 91 and in a plane perpendicular to the paper as indicated by line 94 at right angles to axis 91. Ball sockets 95 equipped with suitable bearing and retainer parts, receive balls 96 which are formed at one end of connecting rods 97. Each connecting rod carries a ball 98 at its opposite end which is locked into piston 99 with suitable bearing and retaining parts. Both pistons 99 and 99 are forced to move through a given stroke in cylinder bore 100. Wobble plate 90 is caused to maintain the required alignment of connecting rods 97 by gear 101 fastened to wobble plate 90 and meshing with teeth of gear 102 fastened to end case 103. Gear 102 is concentric about axis 93 and gear 101 is concentric about axis 91. Exhaust ports as 105 are arranged at one end of the piston stroke and inlet ports 104 at the opposite end. Blower 106 forces air or air and fuel mixture into the cylinder as through port 104 while exhaust gas leaves through port 105 and collector ring 107.

One embodiment of a transmission assembly is shown in Fig. 9 where 21 is the drive shaft driving front and rear differential pinions, 20 is the drive tube transmitting engine torque to flywheel 110 and 19 is the tubular housing connecting the various units as described above.

Clutch fixed pressure plate 111 is attached rigidly to flywheel 110. Movable pressure plate 112 is carried on pressure plate slide pins 113 which are moved axially in plate 111 by clutch control fingers 114 which fulcrum about points 115. Fingers 114 are urged to either side of the neutral position shown, by toggle springs 116. Fingers 114 are controlled by collars 117 on sleeve 118 which is positioned by throwout bearing 119. It will be seen that when sleeve 118 is moved to the left in Fig. 9, after once leaving the central position, toggle springs 116 will urge it to move farther to the left, forcing pin 113 into plate 111 and engaging plate 112 with clutch disc 120. When sleeve 118 is moved to the right, the toggle springs will urge plate 112 into engagement with clutch disc 121. When either clutch disc is engaged no further pressure on throwout bearing 119 is required until another change is made.

Clutch disc 121 drives transmission gear 122 which in turn drives shaft 124 thru gear 408, and clutch disc 120 drives transmission gear 123 which drives shaft 125 thru gear 409. Progressive gear ratios are obtained by using jackshafts 124 and 125 alternately. For example reverse is obtained through gear 400 on shaft 125 driving a reverse idler gear not shown because it lies below gear 400. Gear 400 is driven by shaft 125 thru synchromesh clutch 412. The reverse idler gear in turn drives gear 410 which may be keyed to shaft 21 by clutch 411. First speed is obtained thru gear 401 on shaft 124 driving gear 410. Second and sixth speed gears 402 and 406 are shown on shaft 125. Fourth gear is obtained by direct drive synchromesh at 404. Third and fifth speed gears 403 and 405 are on shaft 124. Synchromesh clutches, well known in the art, are used at every speed as shown with an extra unit 411 to disengage low and reverse gear from shaft 21 when not in use so that those gears will not be rotated at high speeds. Part 302 in Fig. 9 is a flange integral with tube 19 and part 304 is a flange at the opposite end of the transmission connected to the front differential housing 17. Parts 302 and 304 cooperate to support the casing of the transmission.

The clutch and transmission assembly shown is schematic only, and provides an assembly where gears may be shifted into the next higher or next lower gear from any position, the actual drive of the car being changed under full power if desired as the change is made from one clutch to the other. A quick acting toggle lever for finger shift from one clutch to the other is preferred.

Figure 11:
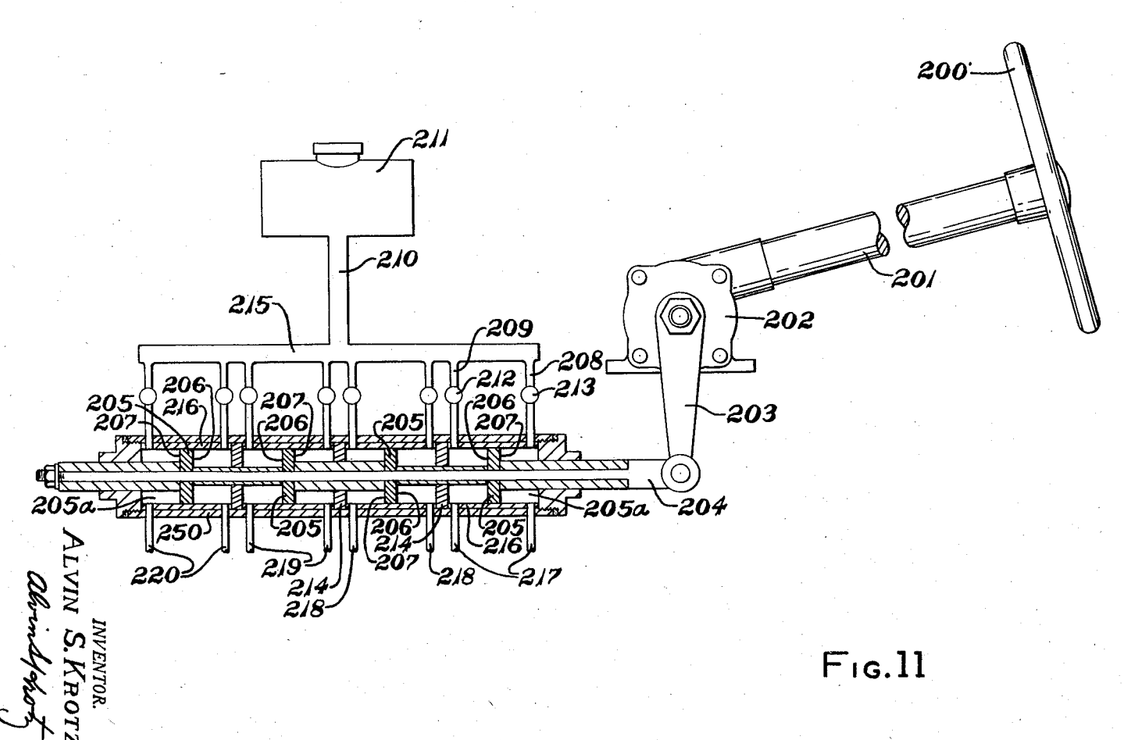
Fig. 11 is a schematic view of a hydraulic steering gear.

Fig. 11 is a diagrammatic section of a hydraulic steering gear having a tubular body 250 bored to receive liners 216 which hold three cylinder headers 214 in place. 200 is a steering wheel, 201 a steering column, 202 a steering gear which may be of conventional construction. Pitman arm 203 operates piston rod 204, which carries four pistons 205 in four cylindrical cavities 205A separated by three cylinder headers 214. Each piston 205 has a differential effective area on opposing sides 206 and 207 corresponding to the difference in area of the pistons of each of the wheel steering cylinders 34, 35, 36, 37, of Fig. 1 with which each piston 205 is associated. Each end of each cylinder cavity 205A communicates through a separate check valve as 212 and 213 and piping as 208, 209 and 210 and manifold 215 with a reservoir 211.

Each end of each cylinder cavity 205A has a separate pipe connection as 217, 218, 219 and 220, each number designating a pair of pipes which connect to a wheel steering cylinder of one of the wheels, pipes 217 being connected, for example, to steering cylinder 36 of the left rear wheel 2 as shown in Fig. 12. In steering the vehicle to the left as in Fig. 5 and Fig. 6, the steering wheel 200 is turned counterclockwise. Thus piston rod 204 is forced to the left and fluid is forced out of the left hand pipes marked 217, 218, 219, and 220 into the wheel steering cylinders on the several wheels by the displacement of the pistons 205.

For example, oil is displaced thru the left line 217 by such movement of its associated piston 205 (the most rightward piston 205) in Fig. 11 to one end of steering cylinder 36 in Fig. 12 to move its piston 36A and turn to wheel. A corresponding volume of oil displaced by this movement of piston 36A is forced back thru the return branch of line 217 to the opposing side 207 (Fig. 11) of this same piston 205. If there is no leakage in the system, there will be sufficient oil returning to the right side 207 of said piston 205 to prevent any vacuum from being drawn in the rightward portion of the cavity housing said most rightward piston 205. However, with any leakage in the system a partial vacuum would develop so that check valve 213 will open permitting flow into the right portion of this cavity and air will not enter the system. In such movement of pistons 205 valves 212 are closed to prevent displacement of oil back to manifold 215 and reservoir 211. Both valves 212 and 213 are one way check valves, permitting flow toward the cavities 205A but not from the cavities.

Fig. 12 shows means of causing the vehicle to understeer on turns, permitting the front and rear wheels to follow the same trace. Weight 240 which may, optionally, be a storage battery, swings transversely of the vehicle from an arm 240A attached to a pivot 221 fastened to a frame member of the vehicle. Finger 222 on the weight arm contacts stops 223 and 224 on piston shaft 225. Gaps 241 may optionally be provided to permit weight 240 some transverse freedom before contacting stops 223 and 224. Pistons 226 and 227 on shaft 225 displace fluid from one side to the other in cylinder 228, steering the rear wheel is by means of this displacement thru pipes 234 and 235. Piston shaft 225 is shown with a smaller diameter at one end as at 229 so that the larger diameter at each end of the small section will pick up washers 230 and 231 as the rod moves. Springs 332 and 233 may be preloaded and bear on washers 230 and 231 so that it requires a predetermined force to start piston rod 225 moving. As centrifugal force due to cornering increases in making a left hand turn, movement of weight 240 to the right displaces fluid out of the right hand pipe marked 235A to steering cylinder 36 and takes fluid into the left hand pipe 235b thereby steering the left rear wheel 2 in a counter clockwise direction proportionate to the magnitude of the centrifugal force, thereby giving the required slip angle to hold the car on its path about a metacenter which moves farther to the left as speed increases but which does not move forward as in conventional cars. Pipes 234 transmit fluid displaced by piston 227 under the same conditions to the other rear wheel steering cylinder 37 to provide a corresponding steering action to the opposite rear wheel 2.

It is well known in the industry that the cornering force exerted by th road surface on a tire when rounding a corner or resisting centrifugal force results in a tendency for the wheel to turn in its plan view, and this tendency is referred to as king pin torque. For a given car and tire the magnitude of king pin torque may be assumed to be proportionate to cornering force and cornering force may be assumed to be proportionate to slip angle within the useful range of slip angle although there are many factors, some of which are not yet fully understood, which effect that relationship. Slip angles greater than ten degrees produce little increase in cornering force and it may be assumed that ten degrees represents approximately the maximum practical slip angle used by the car driver.

The magnitude of king pin torque does vary considerably between cars, and one important factor is caster angle. A positive caster angle, sloping rearward at the top, is a preferred option for the front wheels. Such a king pin caster angle results in an increase in king pin torque due to cornering forces, and the direction of that torque is clockwise in plan view when turning to the left. That king pin torque attempts to straighten the front wheels or steer them out of the turn.

Since the cornering force on a tire while driving on the road may be thought of as shifting rearward due to the motion of the car, as is well known in the art, the cornering force at the rear wheels for this construction will result in a clockwise king pin torque for a left hand turn as for the front wheels. However, a clockwise torque on a turn to the left tends to turn the rear wheels in a direction to turn the car more sharply into the turn. Therefore a negative caster angle, sloping forward at the top, is a preferred option for the rear wheels.

A negative caster angle is well known to diminish king pin torque and in addition, the reversal of front and rear parts lends itself to utilizing a positive caster angle for front wheels and a negative caster angle for rear wheels.

Assuming ten degrees useful slip angle and two degrees negative caster for rear wheels, maximum king pin torque may not exceed eighteen foot pounds for the novel rear wheel construction discussed here. Also assuming ten degrees maximum useful slip angle, the rear wheels, in rounding a curve to the left at moderate speed might be turned ten degrees to the right in accordance with this construction. As speed is increased, to develop a maximum of ten degree slip angle on both front and rear wheels as described here, the understeering device for the rear wheels would then be called upon to turn the rear wheels from ten degrees to the right, to a new position steering ten degrees to the left or a total change of twenty degrees. While it is improbable that the maximum king pin torque of eighteen foot pounds per rear wheel would be necessary throughout this angle, such an extreme condition would call for 75 inch pounds of work per wheel or 150 inch pounds for the two rear wheels.

As a means of obtaining this energy it may be assumed that a twelve volt storage battery weighs fifty pounds and that such a battery is so mounted in the chassis that it can swing transversely, due to transverse accelerations in rounding a curve. If the swing center is fifteen inches above the center of gravity for the battery, at .5 G transverse acceleration the fifty pound mass would have to swing approximately seven inches to develop the 150 pound inches work indicated above. This might be considered approximately the limit of work practical for such a device.

In this invention brake and power application to front and rear wheels, which are geared together to rotate alike, provides appreciably better acceleration and deceleration than now known, since weight transfer to the front during braking and weight transfer to the rear during power application cannot result in one pair of wheels slipping since the front and rear differential carriers must either rotate together or must both stop.

Also since the front and rear differential carriers rotate together the car is restrained fom skidding distinguished from a conventional car where front and rear wheels may rotate at very dissimilar speeds so that control may be lost at one end. Once in a skid, the rear wheels of a conventional car may slide around sideways while the driver attempts to direct the front wheels toward the desired direction of travel. With this invention the rear and front wheels, turning at the same speed, tend to return to the same path and correct the skid.

However such identical rotation of front and rear differential carrier would cause slippage when cornering slowly if the Ackerman type steering now universally used were retained. Therefore the equal but opposite steering angle of front and rear wheel at each side, as shown in this design, has the advantage of satisfying the needs of the equal rotation of front and rear differential carrier.

However, where the rear wheels are provided with steering means it is convenient to correct the rear steering angle while cornering so that, as described, while rounding a corner at speed the rear wheels can be steered into the turn and thereby give the car an added degree of understeering and stability, as described above, which would not be possible with a conventionally built car.

Similarly, if power and brakes are to be applied at identical rotational speeds of front and rear differential carrier, it is possible and convenient to place the brakes at the most advantageous position, and the contact of the road wheels with the road is improved by reducing unsprung weight which is one result of removing the weight of the brakes from the wheels.

Preferably a large amount of power should be available to drive the four wheels, the center of gravity of that power plant should be low, its weight low and it is advantageous to place the power source so that its mass is reasonably symmetrical about the axis of symmetry in plan view. Also the drive shaft connecting front and rear differential carrier drive gears can best be a straight line lying not far from the height of the wheel spindles. To use a conventional engine would call for placing the engine above the drive line, which gives a high center of gravity, or placing the engine in front of the front wheel spindle line which would cause the vehicle to be clumsy in lifting at the front end to accommodate changes in road gradient, or if the engine is placed to the rear of the rear wheel spindle line it would cause the vehicle to be tail heavy and to tend to oversteer on corners. Also the large power required to drive four wheels would require high weight or high engine speeds with presently conventional designs so that a light weight, high performance engine through which a straight line drive shaft may pass becomes of added importance in this combination.

Where there is a front and rear differential carrier, both taking drive and braking forces, and a connecting drive shaft it is logical and advantageous to, in effect, tie these two carriers together in one assembly or housing.

While specific embodiments of the invention are given for illustrative purposes, it is not intended that the broader aspects of the invention be limited to these illustrations.

I claim:
1. A road vehicle comprising a chassis including front and rear dirigible ground wheels, means for steering said front and rear wheels each to turning positions in which the rear wheels are oriented at an angle to the longitudinal axis of the vehicle which angle is substantially equal to but opposite the angle of said front wheels relative to said axis, and means operable in response to lateral acceleration of said vehicle for displacing said rear wheels in a direction to reduce the angle of the aforesaid turned position of said rear wheels proportionate to the magnitude of said lateral acceleration.

2. A road vehicle comprising a chassis including corresponding front and rear dirigible ground wheels substantially aligned with each other longitudinally of the vehicle, means for steering said front and rear wheels each to turned positions such that corresponding front and rear wheels follow substantially the same track as the vehicle is turned, and means operable in response to lateral acceleration of said vehicle for displacing said rear wheels thru an angle proportionate to the magnitude of said lateral acceleration from said turned position thereby to cause said rear wheels to steer more nearly commensurate with the direction of turning of the vehicle.

3. A road vehicle comprising a chassis supported by corresponding front and rear dirigible wheels substantially aligned with each other longitudinally of the vehicle, means for steering said front and rear wheels each to turned positions such that corresponding front and rear wheels follow substantially the same track as the vehicle is turned, means including a mass supported in said chassis for movement laterally of the vehicle in response to lateral acceleration of the vehicle for sensing the magnitude of said lateral acceleration, and means operable in response to the movement of said mass for displacing said rear wheels thru an angle proportionate to the magnitude of said lateral acceleration from the aforesaid turned position to cause said rear wheels to steer more nearly commensurate with the direction of turning of the vehicle.

4. A road vehicle comprising a chassis including a pair of front and a pair of rear dirigible ground wheels, each of the front wheels being aligned longitudinally of the vehicle with a corresponding rear wheel, means for delivering equal rotational effort to each said pairs of wheels, means for simultaneously steering said corresponding front and rear wheels to turned positions such that said corresponding front and rear wheels follow substantially the same track as the vehicle is turned, and means operable in response to lateral acceleration of said vehicle for displacing said pair of rear wheels each thru an angle proportionate to the magnitude of said lateral acceleration from their aforesaid respective turned positions to cause said rear wheels to steer more nearly commensurate with the direction of turning the vehicle.

5. A road vehicle in accordance with claim 4 in which said means for delivering equal rotational effort to each said pairs of wheels comprises a front differential gear unit in driving engagement with said front pair of wheels, a rear differential gear unit in driving engagement with said rear pair of wheels and a shaft directly interconnecting said front and rear differential gear units to equalize the rotational effort transmitted by the differential units to their respective pairs of wheels.

6. A road vehicle as in claim 5 which further comprises an engine on said chassis for propelling said vehicle, said engine having a power output member in axial alignment with said shaft interconnecting said differentials, and means for drivingly engaging said power output member with one of said differential gear units for transmitting power from said engine to each said pairs of wheels.

7. A road vehicle as in claim 6 which comprises vehicle braking means associated with one of the rotary power transmitting elements of the vehicle between said engine and said differentials gear units.

8. A road vehicle comprising a chassis including corresponding front and rear dirigible ground wheels, a hydraulic motor associated with each said wheel for regulating the orientation of each wheel, means for selectively transmitting hydraulic fluid energy to each said hydraulic motor simultaneously for steering said front and rear wheels each to turned positions such that corresponding front and rear wheels follow substantially the same track as the vehicle is turned, and means associated with said rear wheels and operable in response to lateral acceleration of said vehicle for transmitting further hydraulic fluid energy to hydraulic motors of said rear wheels for displacing said rear wheels thru a turning angle proportionate to the magnitude of said lateral acceleration from the aforesaid turned position to cause said rear wheels to steer more nearly commensurate with the direction of turning of the vehicle.

References Cited in the file of this patent

UNITED STATES PATENTS

| | | |
|---|---|---|
| 2,022,987 | Sustersic | Dec. 3, 1935 |
| 2,172,177 | Rose | Sept. 5, 1939 |
| 2,247,985 | Borgward | July 1, 1941 |
| 2,368,933 | Lindeman | Feb. 6, 1945 |
| 2,555,649 | Krotz | June 5, 1951 |
| 2,579,084 | Krotz et al. | Dec. 18, 1951 |